United States Patent [19]

Gordon

[11] Patent Number: 5,016,575
[45] Date of Patent: May 21, 1991

[54] ANIMAL COLLAR

[76] Inventor: Richard A. Gordon, 95 W. 3rd St., Freeport, N.Y. 11520

[21] Appl. No.: 375,201

[22] Filed: Jun. 30, 1989

[51] Int. Cl.$^5$ .............................................. A01K 27/00
[52] U.S. Cl. .................................................... 119/106
[58] Field of Search ...................... 119/96, 106; 2/311, 2/312, 320; 63/3, 5.1, 11

[56] References Cited

U.S. PATENT DOCUMENTS

| | | | |
|---|---|---|---|
| 191,140 | 5/1877 | Hammond et al. | 63/11 |
| 2,084,174 | 6/1937 | Young | 2/320 |
| 2,810,368 | 10/1957 | McCombe | 119/106 |
| 2,956,542 | 10/1960 | Mueller | 119/106 |
| 3,072,098 | 1/1963 | Boemle | 119/106 |
| 3,357,070 | 12/1967 | Sloan | 132/273 |
| 3,387,588 | 6/1968 | Bird | 119/106 |
| 3,540,417 | 11/1970 | Reed | 119/106 |
| 4,189,808 | 2/1980 | Brown | 24/30.5 R |
| 4,413,588 | 11/1983 | Lindholm | 119/106 |

FOREIGN PATENT DOCUMENTS 0260245  7/1949  Switzerland .......................... 119/96

*Primary Examiner*—Robert P. Swiatek
*Assistant Examiner*—Todd E. Manahan
*Attorney, Agent, or Firm*—Bauer & Schaffer

[57] ABSTRACT

There is disclosed an odorless, non-tearable, moisture-resistant animal collar comprising a generally circular, flexible rubber body having an extended portion on the circumference for attachment of a leash and a generally circular central opening therein which is provided with an irregular peripheral pattern to hold the collar more securely about the neck of an animal without choking it, while at the same time permitting a quick release thereof from the animal's neck.

9 Claims, 1 Drawing Sheet

ANIMAL COLLAR

This invention relates to an animal collar. More particularly, this invention relates to a collar for use on small animals such as ferrets, hamsters, gerbils, lizards, and the like.

BACKGROUND OF THE INVENTION

A wide variety of animal collars are known. Such collars are configured to restrain, entrain, guide, and teach animals. Thus, their particular constructional features generally vary widely depending upon the primary aim to be accomplished by their use on animals.

Small animal collars are also known. Generally, they are simple circular structures provided with means for attaching a leash thereto and have a circular opening so that they may be disposed around the neck of the animal with a degree of facility and ease as well as to be easily removable.

A particular problem arises in providing a leash for very small animals such as ferrets, gerbils, and the like. Thus, frequently an individual walks so fast that he or she precedes the animal and thus unadvertently pulls on the leash or lifts the leash. Because these animals are so small and so light in weight, they provide little actual resistance to the force applied by the person leading the animal. As a consequence, the neck of the animal is pulled, twisted, or snapped, which frequently results in fatality. Therefore, it has been necessary to provide a collar for such animals which would permit the animal to escape from the collar when caught in such harmful positions.

Consequently, the strap, belt, or band-like collars cannot be used since once such are buckled or hooked into place they present a fixed loop from which the animal cannot escape.

Generally, collars for ferrets, gerbils, hamsters, and the like are made from a relatively pliable, inexpensive soft leather having a central opening through which the animals head can pass in either direction. The collar is formed in a flat plane, and the central opening may be cut in one or more places to allow a large head to freely pass through it.

Such known collars, while generally accomplishing their end purpose in a satisfactory manner, still exhibit a number of disadvantages. For example, they do not normally exhibit sufficient flexibility and, when further modified to make them more flexible, they do not hole about an animal's neck with a sufficient degree of security and are also so weakened as to be easily torn. In addition, since they are made of inexpensive leather, they are prone to absorb moisture and become odoriferous as well as being easily torn.

There exists, therefore, the need for an animal collar and, particularly, a small animal collar which does not exhibit such drawbacks. The present invention fulfill such a need.

These advantages and objects as well as others will be seen in the subsequent disclosure.

BRIEF STATEMENT OF THE INVENTION

In accordance with the invention, there is provided an odorless, substantially non-tearable, moisture-resistant animal collar comprising a generally circular, flexible rubber body member having an extended portion disposed on the circumference thereof and a generally circular central opening therein for disposition about the neck of an animal, the central opening being provided with an irregular peripheral pattern to hold the collar more securely about the neck of an animal without choking the animal while at the same time permitting a quick release thereof from the neck.

Full details of the present invention are set forth in the following drawings and description.

THE DRAWINGS

In order to describe the invention more fully, reference is directed to the accompanying drawings which are to be taken in conjunction with the following description and in which drawings.

DESCRIPTION OF THE PREFERRED EMBODIMENTS

Figure 1:
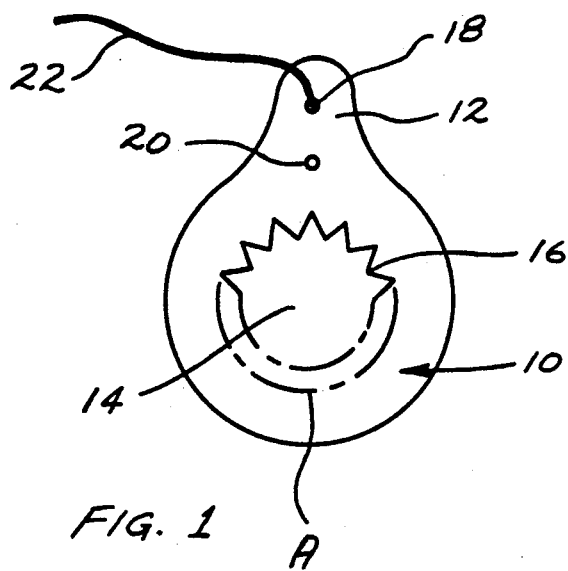
FIG. 1 is a plan view of an animal collar according to the invention.

Referring now to FIG. 1, an animal collar according to the invention comprises a planar generally circular, flexible, rubber-like body member 10 having an extended portion 12 disposed on the circumference thereof and a generally circular central opening 14 therein.

Central opening 14 is provided with an irregular peripheral pattern in the form of scalloping or a plurality of V-shaped notches 16. As may be seen from FIG. 2, the rubber body member 10 is of generally flat, thin construction, thus making it very flexible, although the degree of thinness and flexibility is not critical.

The central opening 14 can thus preferably be made so that its mean diameter between the apex and root of the scallops or V's 16 provides a circumference A (dotted line) which closely fits the neck of the animal. The apexes of the scallops or V's thus hold firmly with the hair or the animal and prevent the collar from easily being dislodged, while the roots are spaced therefrom out of contact with the hair or skin. On the other hand, the collar can be easily flexed and stretched diametrically when pulled over the head of the animal for quick release. Because the collar is made from stretchable rubber-like material, it will not tear or distintergrate in use and has a considerably longer active life than the prior art leather devices. Further, since the scallops or V's extend uniformly about the periphery of the opening 14, tearing is less likely to occur.

As mentioned above, body member 10 is made of thin, flexible rubber and the scalloped or notched periphery 16 of the central opening 14 not only easily flexes in both directions but also has a tendency to return to its normal unflexed position, thus making the collar not only more secure about the neck of an animal but also lessens the danger of choking the animal while at the same time permitting relatively easy release or removal of the collar from the animal's neck. In addition, since the body member is made of rubber-like material, it is moisture-resistant, thus not absorbing moisture which would make it odoriferous if it did so, especially after prolonged use. Moreover, since it is made of such material, the collar of this invention is non-tearable.

Figure 2:
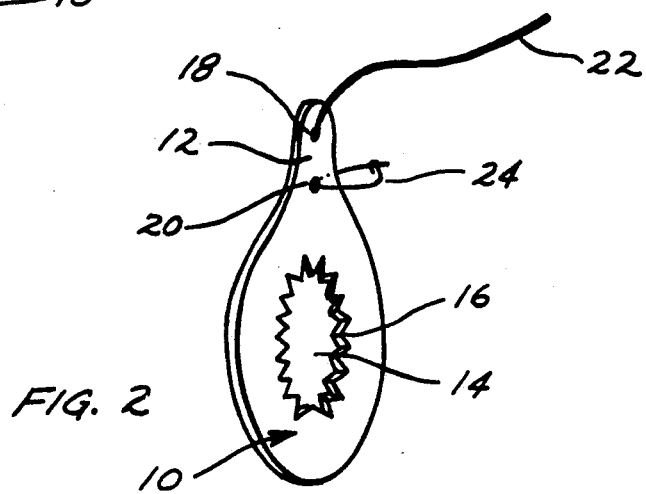
FIG. 2 is a side perspective view of the collar shown in FIG. 1, illustrating the generally flat configuration of the body.

As may also be seen from FIG. 1, extended portion 12 is provided with two openings 18 and 20 for the reception of one end of a leash 22 as seen in FIG. 2 and for a keeper 24, if desired, such as pseudo-jewelled hook or the like to which the opposite end of the lead may be secured.

Figure 3:
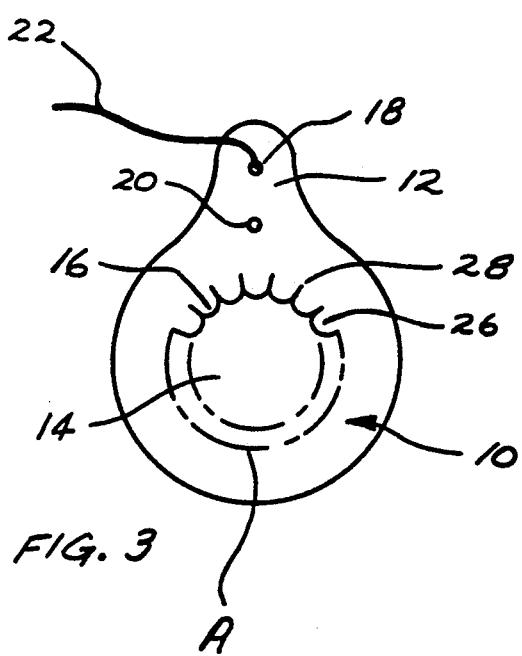
FIG. 3 is a plan view of a second embodiment of the animal collar according to the present invention.
Figure 4:
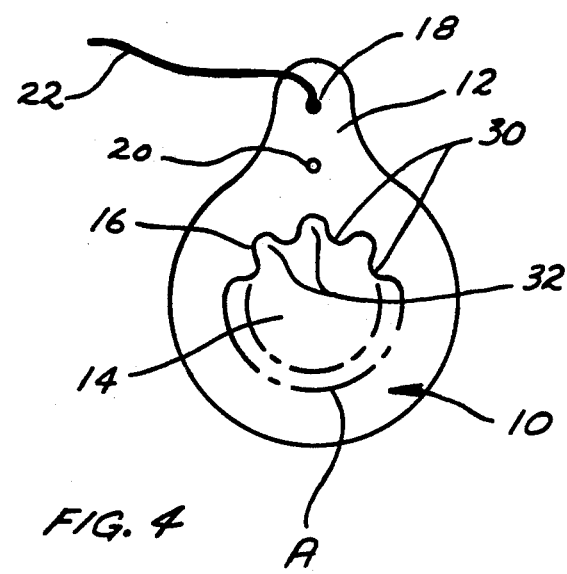
FIG. 4 is a view similar to FIG. 3 showing yet another embodiment.

The inner periphery 14 of the body may be formed in a variety of irregular patterns as seen in FIG. 3 and FIG. 4. In the embodiment of FIG. 3 a close series of scalloping 26 are provided wherein each scallop has a substantially U-shaped with the arms of the U abutting each other as by forming slits 28 in the rubber body between each scallop. In FIG. 4 a plurality of discrete fingers 30 extend radially inward with relatively wide spaces 32 between each finger 30. Although it is advantageous that the scalloping or fingers be oriented of uniform radial length and flexible enough to function as described in the embodiments of FIG. 1 and FIG. 2, combinations and mixtures of the peripheral pattern can be made so that soft and hard, long and short, fingers or scallops can be used together.

In addition to the advantages of the collar of the invention mentioned above, numerous other advantages thereof will be readily apparent to those skilled in the art. It is to be understood that the descriptive embodiments of this invention set forth herein are illustrative only, and the concept of this invention is not to be limited thereby, except as defined in the appended claims.

What is claimed is:

1. An odorless, substantially non-tearable, moisture-resistant animal collar comprising a planar generally circular, flexible, rubber-like body member having an extended portion disposed on the circumference thereof and a generally circular central opening therein for disposition about the neck of an animal, said central opening being provided with an irregular peripheral pattern directed radially inward to hold said collar more securely about said neck without choking said animal, and being flexible out of the plane of said body to enlarge said opening permitting a quick release thereof from the neck of the animal.

2. The Collar according to claim 1 wherein the irregular peripheral pattern is in the form of scalloping.

3. The collar according to claim 2 wherein the scalloping has a means diameter between apex and root, forming a circle approximately equal to the circumference of the neck of the animal.

4. The collar according to claim 1 wherein the irregular peripheral pattern is in the form of a plurality of V-shaped notches.

5. The collar according to claim 4, wherein the peripheral pattern of V-shaped notches has a mean diameter between apex and root, forming a circle approximately equal to the circumference of the neck of the animal.

6. The collar according to claim 1 wherein the irregular peripheral pattern is in the form of a plurality of fingers.

7. The collar according to claim 1 wherein the extended portion disposed on the circumference of the body is provided with a pair of openings.

8. The collar according to claim 7 including a leash having one end thereof disposed in at least one of the pair of openings in the extended portion.

9. The collar according to claim 1 wherein the rubber-like body is generally flat.

* * * * *